United States Patent
Laborde et al.

(10) Patent No.: US 9,377,614 B2
(45) Date of Patent: Jun. 28, 2016

(54) ACTIVE SPACE TELESCOPE WITH SUSPENDED MIRROR

(71) Applicant: THALES, Neuilly-sur-Seine (FR)

(72) Inventors: Cyrille Laborde, Villeneuve Louvet (FR); Gilles Carte, Cannes (FR)

(73) Assignee: THALES (FR)

( * ) Notice: Subject to any disclaimer, the term of this patent is extended or adjusted under 35 U.S.C. 154(b) by 0 days.

(21) Appl. No.: 14/511,075

(22) Filed: Oct. 9, 2014

(65) Prior Publication Data

US 2015/0103402 A1    Apr. 16, 2015

(30) Foreign Application Priority Data

Oct. 11, 2013  (FR) ..................... 13 02361

(51) Int. Cl.
| | |
|---|---|
| *G02B 23/02* | (2006.01) |
| *G02B 7/182* | (2006.01) |
| *G02B 7/183* | (2006.01) |
| *G02B 26/06* | (2006.01) |

(52) U.S. Cl.
CPC ............... *G02B 23/02* (2013.01); *G02B 7/183* (2013.01); *G02B 7/1827* (2013.01); *G02B 26/06* (2013.01)

(58) Field of Classification Search
CPC ...... G02B 23/02; G02B 7/1827; G02B 7/183; G02B 26/06
USPC .................................. 359/399, 871, 872, 877
See application file for complete search history.

(56) References Cited

U.S. PATENT DOCUMENTS

| | | | |
|---|---|---|---|
| 4,619,498 A | 10/1986 | Croiset | |
| 6,128,122 A * | 10/2000 | Drake .................... | H02N 1/008 359/198.1 |
| 2007/0097473 A1 * | 5/2007 | Oshima .................. | G02B 7/183 359/224.1 |
| 2008/0290221 A1 | 11/2008 | Dupuis et al. | |
| 2009/0078850 A1 * | 3/2009 | Pinto ...................... | G02B 26/06 250/201.9 |
| 2009/0303586 A1 * | 12/2009 | Dobermann ........... | G02B 23/00 359/399 |
| 2010/0202071 A1 * | 8/2010 | Preumont .............. | G02B 26/06 359/849 |
| 2011/0211268 A1 * | 9/2011 | Camet ................. | G02B 26/0825 359/849 |
| 2011/0310502 A1 * | 12/2011 | Blanchard ............ | G02B 7/1822 359/850 |
| 2013/0229709 A1 * | 9/2013 | Newswander ......... | G02B 23/02 359/399 |

FOREIGN PATENT DOCUMENTS

| | | |
|---|---|---|
| EP | 0121470 A1 | 10/1984 |
| EP | 1676776 A1 | 7/2006 |

OTHER PUBLICATIONS

A. Labeque, et al., "Design of a Servo-Mechanism to Control the Position of a Mirror in a Space Experiment", Space Science Instrumentation, Jan. 1, 1975, pp. 419-437, vol. 1, Reidel Publishing Co., Dordrecht, NL, XP000576307.

* cited by examiner

*Primary Examiner* — Frank Font
(74) *Attorney, Agent, or Firm* — Baker Hostetler LLP

(57) ABSTRACT

An active space telescope intended to be mounted on a satellite and comprising at least one mirror, a mechanism for servo-controlling the mirror according to at least three degrees of freedom which comprises actuators and a support fixed to the actuators, an interface for fixing the mirror to the servo-control mechanism. The interface is a suspension system of predetermined stiffness which allows dynamic displacements of the mirror relative to the servo-control mechanism, and the telescope comprises means for limiting these dynamic displacements in the form of elastic abutments and means of cooperation with these elastic abutments.

7 Claims, 2 Drawing Sheets

ACTIVE SPACE TELESCOPE WITH SUSPENDED MIRROR

CROSS-REFERENCE TO RELATED APPLICATION

This application claims priority to foreign French patent application No. FR 1302361, filed on Oct. 11, 2013, the disclosure of which is incorporated by reference in its entirety.

FIELD OF THE INVENTION

The field of the invention is that of the active space telescopes intended to be installed onboard a satellite.

BACKGROUND

It will be recalled that a space telescope comprises optical elements such as mirrors. An example of space telescope, of Korsch type, is shown in FIG. 1a, in which the distances between mirrors are also indicated. A pierced parabolic mirror M1 returns the rays from infinity to the planar mirror M2 which reflects them through the aperture formed in the mirror M1, onto another parabolic mirror M3 via a return mirror Mr. From M3 the rays converge on a focal plane PF. When these elements M1, M2, M3 and Mr are positioned in the telescope in a fixed manner, that is to say with no in-flight servo-positioning mechanism, the telescope is called a passive telescope. When at least one optical element is associated with an in-flight servo-positioning mechanism, the telescope is called an active telescope. Hereinbelow, an active telescope is considered with at least one mirror linked to a servo-control mechanism, for example the mirror M2.

The servo-control mechanism of the mirror has a number of degrees of freedom in rotation and/or translation provided by means of actuators, the mirror being fixed to the servo-control mechanism by a single foot, as shown in FIG. 1b for a mirror M2 (11) linked by a foot 12 to a servo-control mechanism 2 which has 5 degrees of freedom: 3 in translation respectively on the axes x, y and z, and 2 in rotation about the axis y and about the axis x. The servo-control mechanism 2 comprises actuators 21 linked on the one hand to the foot 12 through a plate 23 and on the other hand to the support 22 of the servo-control mechanism which is itself fixed to the frame of the telescope (not represented).

Each mirror, and more particularly the mirror M2 which is installed at the top of the telescope, is subjected to significant accelerations when the satellite onboard which it is installed is launched. This demands a servo-control mechanism capable of withstanding significant acceleration loadings, typically of approximately 1800 N (6 kg weight of the mirror M2 under an acceleration of 30 g, g being Earth's gravity) distributed over all the actuators.

One solution consists in developing linear actuators that withstand strong loads; however, such actuators are not currently available on the market. Such actuators will need to have a significant rigidity which will increase the weight of the mechanism; however, this presents a drawback inasmuch as this excess load is situated in an area of the satellite that does not favour its agility.

Consequently, there currently remains a need for an active space telescope comprising at least one mirror linked to a servo-control mechanism, and that simultaneously gives satisfaction to all of the abovementioned requirements, in terms of weight of the servo-control mechanism and of use of existing actuators.

SUMMARY OF THE INVENTION

The invention is based on the installation of a suspension system between the mirror and its servo-control mechanism, accompanied by elastic abutments.

More specifically, the subject of the invention is an active space telescope intended to be mounted on a satellite and comprising:
- at least one mirror,
- a mechanism for servo-controlling the mirror according to at least three degrees of freedom which comprises actuators and a support linked to the actuators,
- an interface for fixing the mirror to the servo-control mechanism.

It is mainly characterized in that the interface is a suspension system of predetermined stiffness which allows dynamic displacements of the mirror relative to the servo-control mechanism, and in that the telescope also comprises means for limiting these dynamic displacements in the form of elastic abutments and means of cooperation with these elastic abutments, independent of the alignment and the direction of said displacements.

According to a first embodiment, the elastic abutments are fixed to the support of the servo-control mechanism, and the mirror comprises the means of cooperation with these elastic abutments.

According to another embodiment, the elastic abutments are fixed to the mirror and the support of the servo-control mechanism comprises the means of cooperation with these elastic abutments.

This suspension system associated with the elastic abutments makes it possible to reduce the loadings supplied to the servo-control mechanism while reducing the weight of the area of the mirror, which has a direct impact on the weight of the telescope, and while using actuators available on the market.

According to one feature of the invention, the suspension system having a minimum frequency determined as a function of in-flight satellite attitude control constraints, the stiffness k is determined as a function of this minimum frequency.

The suspension system comprises, for example, metal springs or flexible link elements made of elastomer.

The elasticity and the damping of the abutments are typically determined as a function of accelerations to which the mirror is likely to be subjected.

The telescope is, for example, of Korsch or Cassegrain or TMA type.

The servo-control mechanism advantageously comprises means for locking the suspension system, notably for testing the telescope on the ground.

BRIEF DESCRIPTION OF THE DRAWINGS

Other features and advantages of the invention will become apparent on reading the following detailed description, given as a nonlimiting example and with reference to the attached drawings in which.

From one figure to another, the same elements are identified by the same references.

DETAILED DESCRIPTION

Figure 1A:
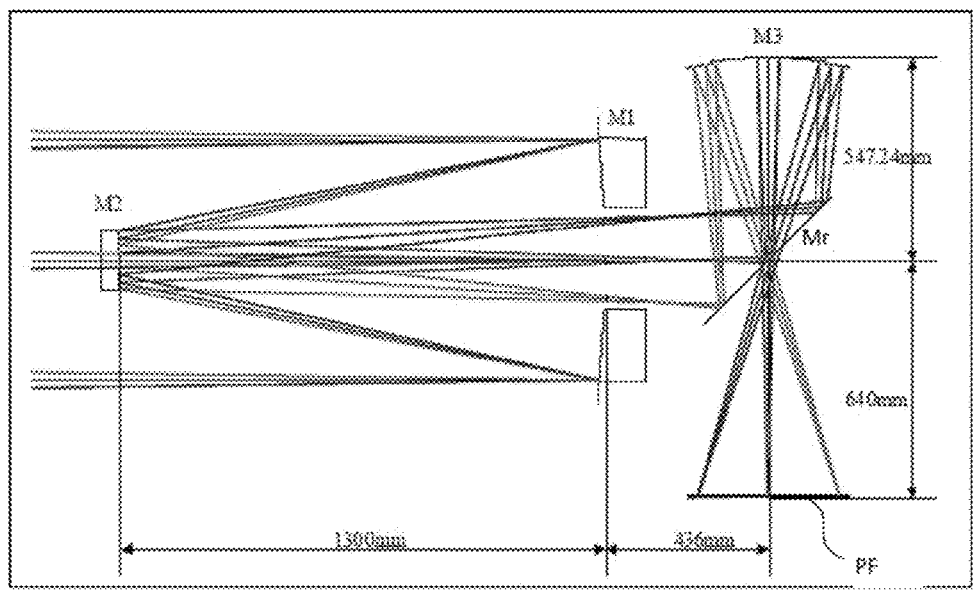
FIG. 1a, already described, schematically represents an optical configuration of an active space telescope according to the prior art, FIG. 1b schematically representing in more detail the servo-control mechanism of a mirror, in this case the mirror M2, FIG. 2 schematically represents an example of servo-control mechanism of a mirror of an active space telescope according to the invention, in this case the mirror M2.
Figure 1B:
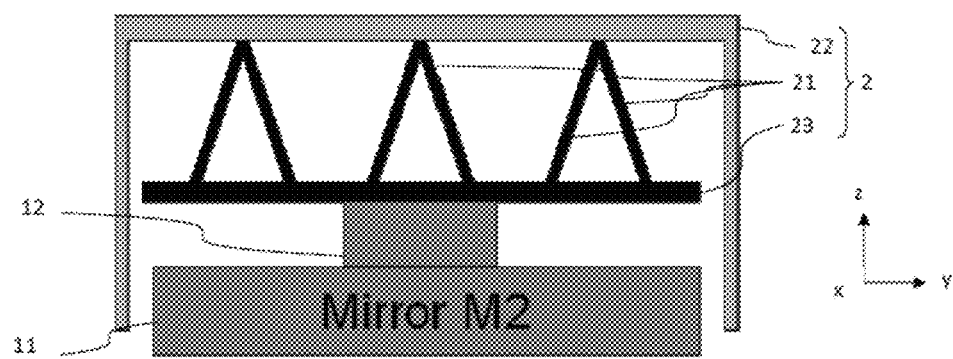
Figure 2:
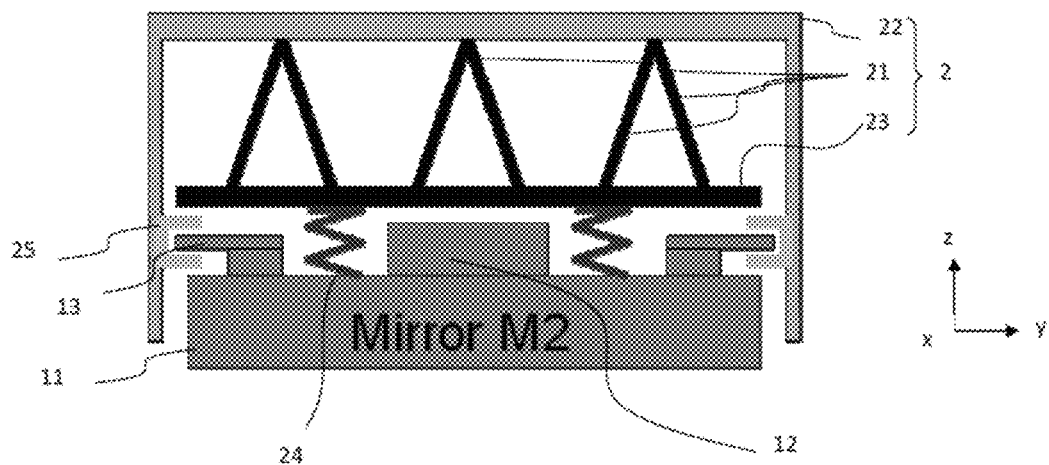

An example of a servo-control mechanism of an active space telescope mirror is described in relation to FIG. 2. The mirror 11 is fixed to the servo-control mechanism 2 by an interface which comprises a suspension system of predetermined stiffness which allows dynamic displacements of the mirror 11 relative to the servo-control mechanism 2. This suspension system comprises, for example, metal springs 24 or flexible link elements made of elastomer.

The telescope further comprises means for limiting these dynamic displacements in the form of elastic abutments and means of cooperation with these elastic abutments.

According to a first embodiment shown in FIG. 2, these elastic abutments 25 are fixed to the support 22 of the servo-control mechanism, and the mirror 11 comprises the means of cooperation with these abutments, such as metal dogpoints 13 that fit into the space defined by these abutments 25, or shouldered pins, possibly removable, making it possible to produce an attachment with the abutments regardless of the alignment and the direction of the relative displacement between the mirror 11 and the support 22, that is to say independent of the alignment and the direction of the dynamic displacements.

Figure 3:
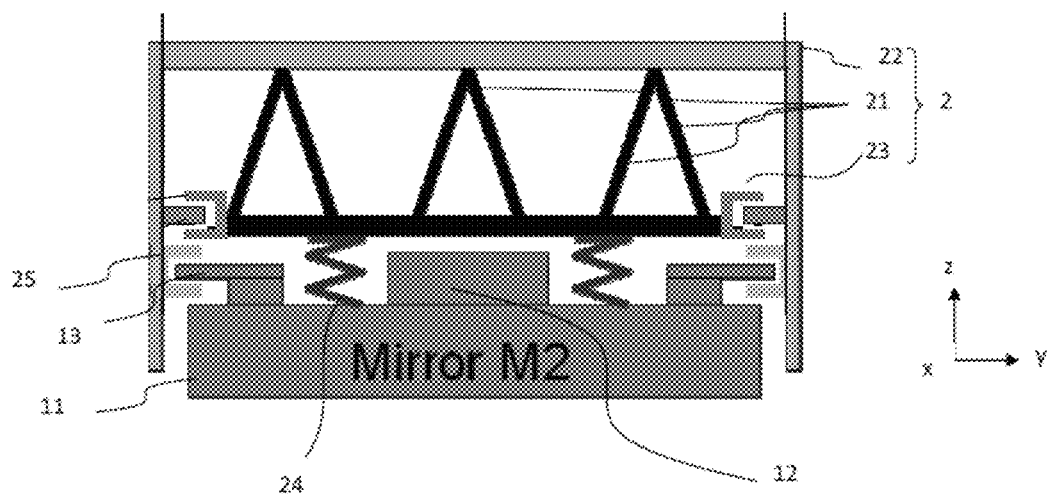
FIG. 3 schematically represents an another example of a servo-control mechanism of a mirror of an active space telescope according to the invention.

According to another embodiment illustrated in FIG. 3, these elastic abutments 25 may be fixed to the mirror 11 and the support 22 of the servo-control mechanism 2 comprises the means of cooperation 13 with these abutments 25. Obviously, this also makes it possible to produce a contact with the abutments 25 independent of the alignment and the direction of the relative displacement between the mirror 11 and the support 22, that is to say independent of the alignment and the direction of the dynamic displacements.

The interface is advantageously equipped with a locking device, such as the rigid foot 12 provided with a device for attaching to the plate 23, without the metal dogpoints 13 coming into contact with the abutments 25 under its own weight. On the ground, the suspension system is then locked during the optical measurements of the optical elements of the telescope. The in-flight position of the mirror is defined by the servo-control mechanism.

The stiffness of the suspension system is typically predetermined as a function of the weight M and the frequency f of the suspended assembly (mirror+springs) which is tuned to a minimum frequency with respect to the Attitude Orbital Control System (AOCS), i.e. approximately 10 Hz. M being the weight of the suspended assembly, it will be recalled that the frequency f is linked to the stiffness k by the formula:

$$f=(1/2\pi)\cdot(k/M)^{1/2}$$

A minimum frequency of 10 Hz therefore has a corresponding minimum suspension stiffness of the order of 24 000 N/m, for a weight M of 6 kg. This stiffness can also be determined by trial and error.

The elastic abutments 25 make it possible to limit the dynamic displacement, typically to ±2.5 mm on the axis z that is divided up between a functional play of the abutments of between 0.5 and 1 mm and an elastic deformation of the abutments of between 1.5 and 2 mm. With this displacement, the springs 24 return to the actuators 21 a load:

$$F=k\cdot x,$$

k being the stiffness of the suspension springs and x being the displacement, i.e. 60 N to the actuators, compared with 1800 N without any suspension system. The elasticity of the suspension is determined as a function of accelerations to which the mirror is likely to be subjected during its operational mission. In flight, the maximum accelerations linked to the agility are of the order of $2°/s^2$, i.e. approximately $0.007$ m/s² at 2 m from the centre of gravity corresponding to a displacement of 1.7 μm which is within the order of magnitude of the usual stability. The frequency can be increased if necessary: for example 15 Hz makes it possible to change to a displacement of 0.8 μm.

The elasticity and the damping of the abutment are determined as a function of accelerations to which the mirror 11 is likely to be subjected during qualification tests on the ground and during the launching of the satellite on which the active telescope is installed. The stiffness of the abutments is determined in relation to the dynamic characteristics of the active telescope and of the satellite on which it is installed to avoid dynamic couplings and reduce the accelerations to which the mirror 11 is subjected and the dynamic displacements between the mirror 11 and the support 22.

This suspension system associated with the elastic abutments makes it possible to reduce by a factor 30 the loads applied to the servo-control mechanism while reducing the weight of the area of the mirror M2, which has a direct impact on the weight of the telescope, and while using actuators available on the market.

The mirror M2 of a telescope of Korsch type, as described in the preamble, has been taken as example, but the invention of course applies to any other servo-controlled mirror, whether it be the mirror M1 or M3 or Mr, or a plurality of mirrors. More generally, it applies to any mirror of an active space telescope of Cassegrain or TMA (acronym for "Three-Mirror Anastigmat") type, etc.

The telescope that is thus equipped with this servo-control mechanism can be mounted horizontally or vertically on the satellite.

The invention claimed is:

1. An active space telescope comprising:
   at least one mirror;
   a mechanism for servo-controlling the at least one mirror according to at least three degrees of freedom which comprises actuators and a support fixed to the actuators;
   an interface for fixing the at least one mirror to the servo-control mechanism;
   elastic abutments; and
   means of cooperation with the elastic abutments,
   wherein the interface is a suspension system of predetermined stiffness configured to allow dynamic displacements of the at least one mirror relative to the servo-control mechanism,
   wherein the elastic abutments are fixed to the support of the servo-control mechanism and the at least one mirror includes the means of cooperation with the elastic abutments, and
   wherein the elastic abutments and the means of cooperation with the elastic abutments are configured to limit the dynamic displacements of the at least one mirror independent of a direction of the dynamic displacements.

2. The active space telescope according to claim 1, wherein the suspension system having a minimum frequency determined as a function of in-flight satellite attitude control constraints, the predetermined stiffness is determined as a function of this minimum frequency.

3. The active space telescope according to claim 1, wherein the suspension system comprises metal springs or flexible link elements made of elastomer.

4. The active space telescope according to claim 1, wherein the elastic abutments exhibit an elasticity and a damping that are determined as a function of accelerations to which the at least one mirror is likely to be subjected.

5. The active space telescope according to claim 1, wherein the telescope is of Korsch type.

6. The active space telescope according to claim 1, wherein the servo-control mechanism comprises means for locking the suspension system.

7. An active space telescope comprising:
   at least one mirror;
   a mechanism for servo-controlling the at least one mirror according to at least three degrees of freedom which comprises actuators and a support fixed to the actuators;
   an interface for fixing the at least one mirror to the servo-control mechanism;
   elastic abutments; and
   means of cooperation with the elastic abutments,
   wherein the interface is a suspension system of predetermined stiffness configured to allow dynamic displacements of the at least one mirror relative to the servo-control mechanism,
   wherein the elastic abutments are fixed to the at least one mirror and the support of the servo-control mechanism includes the means of cooperation with the elastic abutments, and
   wherein the elastic abutments and the means of cooperation with the elastic abutments are configured to limit the dynamic displacements of the at least one mirror independent of a direction of the dynamic displacements.

* * * * *